(12) United States Patent
Nakayama et al.

(10) Patent No.: US 10,288,880 B2
(45) Date of Patent: May 14, 2019

(54) PANEL OPENING/CLOSING DEVICE

(71) Applicant: Panasonic Intellectual Property Management Co., Ltd., Osaka (JP)

(72) Inventors: Kenji Nakayama, Osaka (JP); Takahiro Kuroda, Kanagawa (JP); Yutaka Masui, Kanagawa (JP); Yasushi Ejiri, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/791,446

(22) Filed: Oct. 24, 2017

(65) Prior Publication Data

US 2018/0045959 A1   Feb. 15, 2018

Related U.S. Application Data

(63) Continuation of application No. PCT/JP2016/001992, filed on Apr. 13, 2016.

(30) Foreign Application Priority Data

May 7, 2015   (JP) ................ 2015-094817

(51) Int. Cl.
| | |
|---|---|
| *G02B 27/01* | (2006.01) |
| *F16C 11/04* | (2006.01) |
| *B60R 11/02* | (2006.01) |
| *F16H 21/40* | (2006.01) |

(Continued)

(52) U.S. Cl.
CPC .......... *G02B 27/0149* (2013.01); *B60K 37/04* (2013.01); *B60R 11/0229* (2013.01); *F16C 11/04* (2013.01); *F16H 21/40* (2013.01); *F16H 35/18* (2013.01); *B60K 35/00* (2013.01); *G02B 2027/0154* (2013.01); *G02B 2027/0156* (2013.01)

(58) Field of Classification Search
CPC .............. H04B 1/082; B60K 2350/405; G02B 2027/0154
See application file for complete search history.

(56) References Cited

U.S. PATENT DOCUMENTS 5,457,575 A * 10/1995 Groves ................. B60K 35/00
                                                       353/13
6,659,405 B1   12/2003 Takagi et al.
(Continued)

FOREIGN PATENT DOCUMENTS

| JP | 60-186490 U | 12/1985 |
|---|---|---|
| JP | 4-368244 | 12/1992 |

(Continued)

OTHER PUBLICATIONS

International Search Report of PCT application No. PCT/JP2016/001992 dated Jul. 5, 2016.

*Primary Examiner* — Bradley Duckworth
(74) *Attorney, Agent, or Firm* — Greenblum & Bernstein, P.L.C.

(57) ABSTRACT

A panel opening/closing device includes: a support which supports a panel and is turnable about a first rotary shaft; a dial which is turnable about a second rotary shaft in accordance with an operation by a user; and a movable unit which undergoes horizontal movement and includes pins inserted into a groove of the dial and a groove of the support, respectively.

7 Claims, 9 Drawing Sheets

(51) Int. Cl.
*F16H 35/18* (2006.01)
*B60K 37/04* (2006.01)
*B60K 35/00* (2006.01)

(56) References Cited

U.S. PATENT DOCUMENTS

| | | | | |
|---|---|---|---|---|
| 7,764,490 | B2* | 7/2010 | Muraki | G03G 15/5016 |
| | | | | 248/917 |
| 8,254,594 | B2* | 8/2012 | Yamada | H04B 1/082 |
| | | | | 381/389 |
| 9,116,339 | B2* | 8/2015 | Ruyten | G02B 27/0149 |
| 9,864,196 | B2* | 1/2018 | Ruyten | G02B 27/0149 |
| 9,939,641 | B1* | 4/2018 | Quiroz de la mora | ................. |
| | | | | B60K 37/04 |
| 10,021,793 | B2* | 7/2018 | Chien | B60K 35/00 |
| 2008/0232050 | A1 | 9/2008 | Muraki | |
| 2009/0088792 | A1 | 4/2009 | Hoell, Jr. et al. | |
| 2010/0308099 | A1 | 12/2010 | Marczyk et al. | |
| 2017/0082857 | A1* | 3/2017 | Schoch | B60K 35/00 |
| 2018/0149868 | A1* | 5/2018 | Nakayama | B60K 35/00 |
| 2018/0157041 | A1* | 6/2018 | Huang | G02B 27/0149 |
| 2018/0267310 | A1* | 9/2018 | Quiroz de la Mora | ................. |
| | | | | G02B 27/0149 |

FOREIGN PATENT DOCUMENTS

| | | |
|---|---|---|
| JP | 2001-010414 | 1/2001 |
| JP | 2008-233392 | 10/2008 |
| JP | 2009-082705 | 4/2009 |
| JP | 2010-279694 | 12/2010 |
| WO | 2003/011647 | 2/2003 |

* cited by examiner

PANEL OPENING/CLOSING DEVICE

CROSS-REFERENCE TO RELATED APPLICATIONS

This application is a continuation of the PCT International Application No. PCT/JP2016/001992 filed on Apr. 13, 2016, which claims the benefit of foreign priority of Japanese patent application No. 2015-094817 filed on May 7, 2015, the contents all of which are incorporated herein by reference.

BACKGROUND

1. Technical Field

The present disclosure relates to a panel opening/closing device for opening/closing a panel.

2. Description of the Related Art

Conventionally, head-up displays to be equipped to vehicles such as automobiles are known. Known examples of the head-up displays include a head-up display which assists drivers by displaying information on a panel (for example, a combiner or a monitor). The panel is positioned to stand in front of a driver, but a problem with the panel is that when the driver does not use it, for example, the standing panel is in the driver's vision, becoming a hindrance to driving.

As a technique for solving such a problem, International Publication No. 2003/011647 (hereinafter referred as PTL 1), for example, discloses a mechanism that allows a monitor to lie flat on a dashboard when the monitor is not in use, and allows the monitor to stand when in use.

SUMMARY

The panel opening/closing device according to the present disclosure includes: a support which fixedly supports a panel and turns about a first rotary shaft; and a dial which is shaped in a gear and turns about a second rotary shaft and is provided with a scroll-shaped groove varying in distance from the second rotary shaft. Furthermore, the panel opening/closing device further includes: a movable unit which undergoes linear movement along with turn of the dial and includes a first protruding portion that is inserted in the groove of the dial and a turn driving portion that turns the support along with the linear movement; and a casing which houses the support, the dial, and the movable unit therein.

According to the present disclosure, it is possible to provide a simply-structured panel opening/closing device with a small number of components.

DETAILED DESCRIPTION OF PREFERRED EMBODIMENTS

Prior to describing exemplary embodiments of the present disclosure, problems in the device of the related art are described briefly. The mechanism in PTL 1 has the problem of being complex in structure with a large number of components.

An object of the present disclosure is to provide a simply-structured panel opening/closing device with a small number of components.

Hereinafter, an exemplary embodiment of the present disclosure is described with reference to the drawings.

Figure 1:
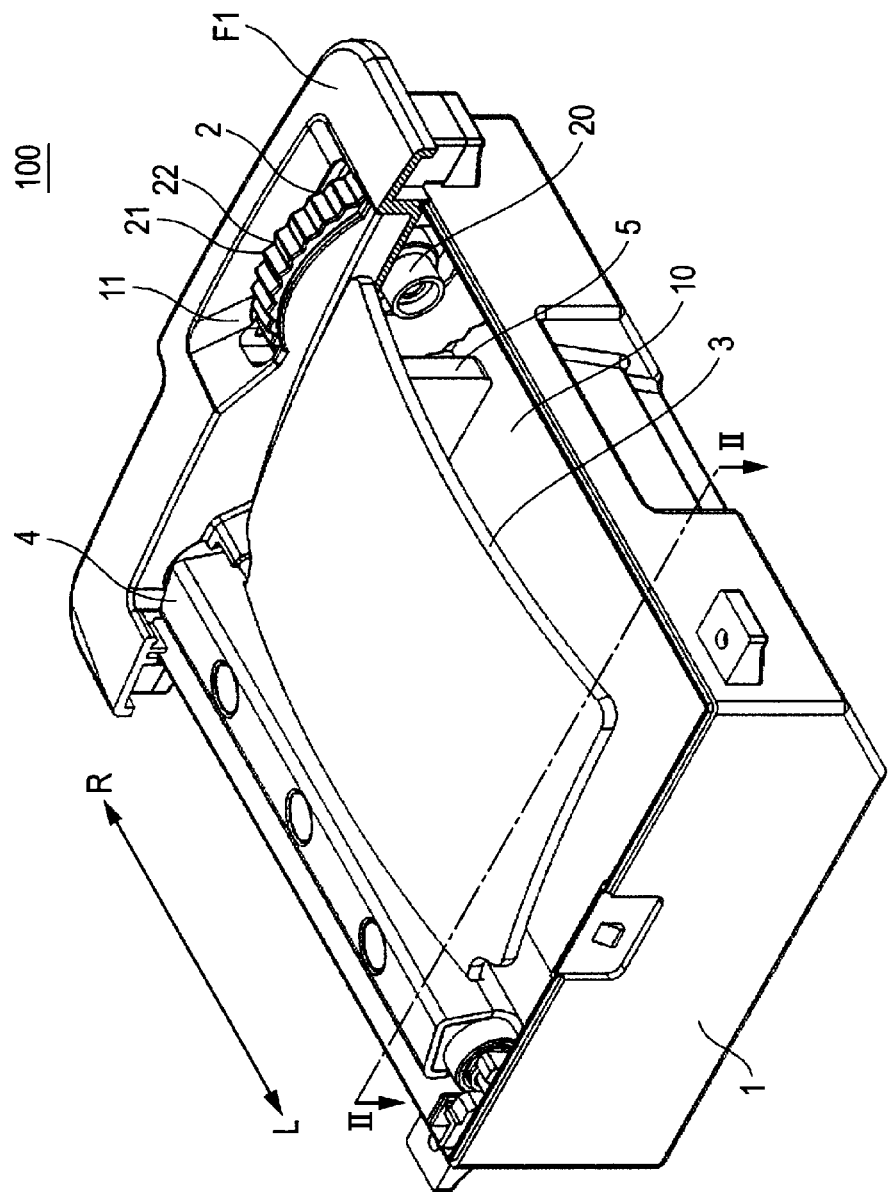
FIG. 1 is a perspective view illustrating the external appearance of a panel opening/closing device (in a storage state) according to an exemplary embodiment of the present disclosure.
Figure 2:
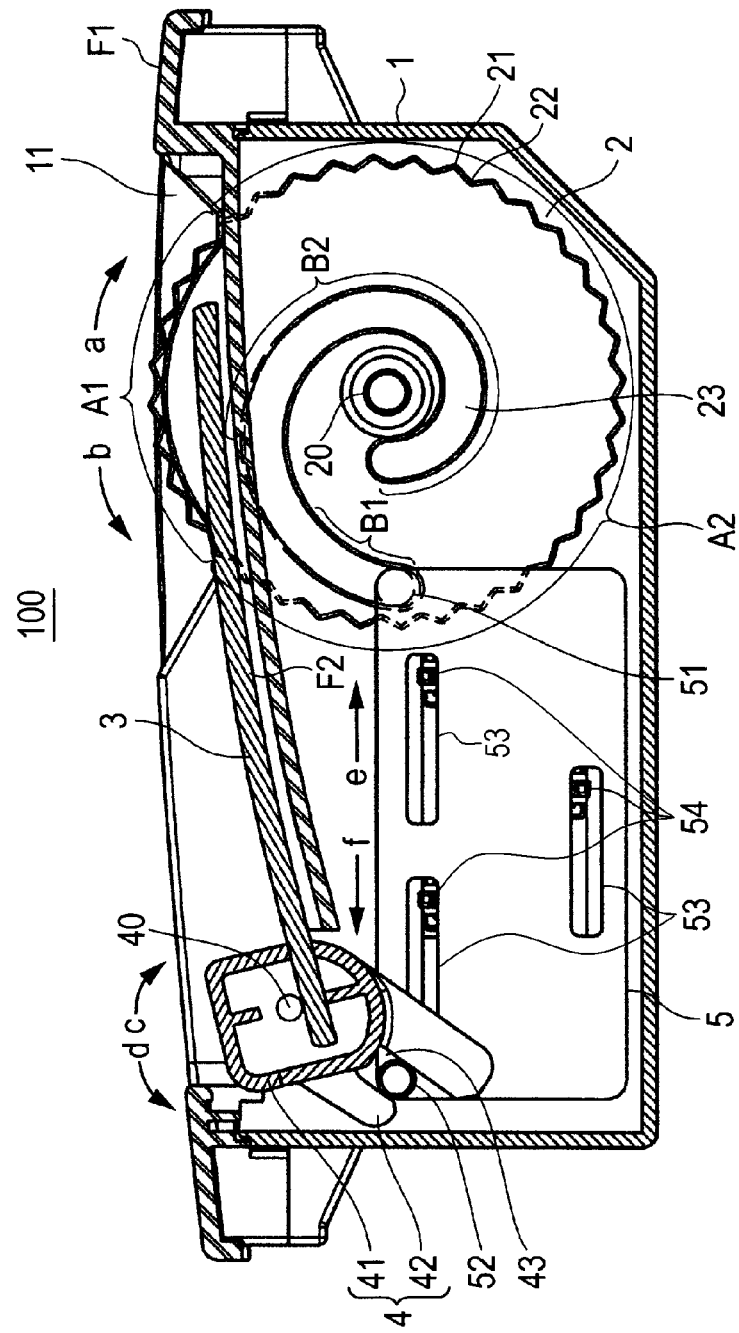
FIG. 2 is a lateral cross-sectional view illustrating the inside of the panel opening/closing device (in the storage state) according to the exemplary embodiment of the present disclosure.

First, a configuration example of panel opening/closing device 100 according to the present exemplary embodiment is described with reference to FIGS. 1 and 2. FIG. 1 is a perspective view illustrating the external appearance of panel opening/closing device 100. FIG. 2 is a cross-sectional view taken along II-II of FIG. 1.

Panel opening/closing device 100 illustrated in FIG. 1 is installed in an instrumental panel (also called a dashboard) of a vehicle, for example, and causes combiner 3 (one example of panels) to open and close corresponding to an operation of dial 2 by a user (a driver or a passenger).

According to an opening operation (an operation of opening combiner 3) or a closing operation (an operation of closing combiner 3) of combiner 3 performed by panel opening/closing device 100, combiner 3 is placed in one of a storage state, a standing state, and an angle adjustment state.

In the storage state, combiner 3 lies flat to be stored in casing 1. In the standing state, combiner 3 is standing. In the angle adjustment state, combiner 3 is adjustable by a user to a desired angle.

Combiner 3 transitions from the storage state to the standing state by the opening operation. Combiner 3 transitions from the standing state to the angle adjustment state by the opening operation. Combiner 3 transitions from the angle adjustment state to the standing state by the closing operation. Combiner 3 transitions from the standing state to the storage state by the closing operation. Note that both FIGS. 1 and 2 illustrate combiner 3 in the storage state.

As illustrated in FIGS. 1 and 2, panel opening/closing device 100 includes casing 1, dial 2 shaped in a gear, combiner 3, support 4, and movable unit 5.

Casing 1 houses dial 2, combiner 3, support 4, and movable unit 5 therein.

Casing 1 is provided with opening 10 in a central part thereof. Combiner 3 is stored through opening 10.

As illustrated in FIG. 1, casing 1 is provided with recess 11 in a right-end part. A part (an operating region to be described later) of dial 2 is exposed in recess 11. The right-end of casing 1 is an end of a direction indicated by arrow R in FIG. 1.

A lower part of casing 1 (for example, a part below top face part F1) is embedded in the instrumental panel. In this case, it is preferable that top face part F1 be substantially level with the surface of the instrumental panel. This keeps casing 1 from hindering the driver's vision.

Dial 2 is a disc-shaped member and is provided on the right-end part of casing 1, as illustrated in FIG. 1. Dial 2 includes rotary shaft 20 and turns clockwise (in the direction of arrow "a") or counter-clockwise (in the direction of arrow "b") about rotary shaft 20.

Dial 2 includes an operating region formed along the circumference thereof. The operating region is where an operation of rotating dial 2 is performed by a user. In the example in FIG. 2, dial 2 includes operating region A1 and operating region A2.

Operating region A1 is where a first operation or a second operation is performed. The first operation is to turn dial 2 counter-clockwise to cause combiner 3 to transition from the storage state to the standing state. The second operation is to turn dial 2 clockwise to cause combiner 3 to transition from the standing state to the storage state.

Operating region A2 is where a third operation or a fourth operation is performed. The third operation is to turn dial 2 counter-clockwise to adjust the angle of combiner 3. The fourth operation is to turn dial 2 clockwise to adjust the angle of combiner 3.

Protrusions 21 and recesses 22 are alternately formed in operating regions A1 and A2 to avoid slipping of the user's fingers during an operation. Note that the shape of operating region A1 and the shape of operating region A2 may be different to allow a user to easily distinguish operating region A1 and operating region A2 during an operation. For example, protrusions 21 in operating region A1 may be larger (or higher) than protrusions 21 in operating region A2. Accordingly, a user can easily know which operating region he or she is operating or which operating region can be operated from the sensation of touching operating regions A1 and A2.

Furthermore, dial 2 is provided with scroll-shaped groove 23 varying in distance from rotary shaft 20 in accordance with the angle of rotation of dial 2. Pin 51 (the first protruding portion) of movable unit 5 to be described later is inserted into groove 23.

Groove 23 includes groove region B1 and groove region B2. Groove region B1 is where pin 51 slides when dial 2 turns by the operation performed on operating region A1. Groove region B2 is where pin 51 slides when dial 2 turns by the operation performed on operating region A2. Groove region B1 and groove region B2 are connected to each other. The distance between rotary shaft 20 and groove region B1 is greater than the distance between rotary shaft 20 and groove region B2.

Combiner 3 is, for example, one-way window, and includes a glass plate and a light semi-transmissive film made of tin, silver, or the like deposited on one side of the glass plate. Combiner 3 is semi-transmissive and is formed so that a user can visually check the front of the vehicle through combiner 3.

An image from a projection device (not illustrated in the drawings) incorporated in the vehicle is projected onto projection screen F2 of combiner 3 illustrated in FIG. 2 when combiner 3 is in the standing state or the angle adjustment state. Thus, a user views the image projected onto combiner 3, overlaid with a view forward of the vehicle. Examples of this image include an image indicating the speed of the vehicle, the amount of remaining fuel, etc., or an image indicating the distance to a destination, the direction of travel, the name of the current location, the names of nearby facilities and shops at the current location, etc.

Note that a combination of panel opening/closing device 100 and the projection device may be called a "head-up display device".

Support 4 includes rotary shaft 40 and turns clockwise (in the direction of arrow "c") or counter-clockwise (in the direction of arrow "d") about rotary shaft 40.

Support 4 includes main unit 41 and pin holder 42. Main unit 41 fixedly supports combiner 3. Pin holder 42 is provided with groove 43. Pin 52 of movable unit 5 to be described later is inserted into groove 43. Main unit 41 and pin holder 42 turn clockwise or counter-clockwise about rotary shaft 40.

Movable unit 5 is a plate-shaped member and is provided is the right-end part of casing 1, as illustrated in FIG. 1. Movable unit 5 undergoes horizontal movement (one example of the linear movement) in the direction of arrow "e" or the direction of arrow "f" shown in FIG. 2. Note that the direction of arrow "e" is directed backward of the vehicle and the direction of arrow "f" is directed forward of the vehicle.

Movable unit 5 includes pin 51 (one example of the protruding portion) and pin 52 (one example of the rotation driving portion). Pin 51 fixedly stands on a surface facing dial 2, of movable unit 5 and is inserted into groove 23 of dial 2. Pin 52 fixedly stands on a surface of movable unit 5 opposite dial 2 and is inserted into groove 43 of pin holder 42.

Movable unit 5 is further provided with grooves 53 along the directions of the horizontal movement (the directions of arrows "e" and "f"). Pins 54 (a second protruding portion) fixed to casing 1 are inserted into grooves 53, respectively. Each of pin 54s slides in respective one of grooves 53 when movable unit 5 undergoes the horizontal movement. This allows movable unit 5 to undergo the horizontal movement without running off a line in the direction of arrow "e" or arrow "f".

Although there are three grooves 53 in the present exemplary embodiment, the number of grooves 53 is not limited to this number. Furthermore, although there are three pins 54 to be inserted into single groove 53 in the present exemplary embodiment, the number of pins 54 is not limited to this number.

The foregoing describes the configuration example of panel opening/closing device 100.

Next, an operation example of panel opening/closing device 100 is described. The following describes each of the operation in which combiner 3 transitions from the storage state to the standing state (hereinafter referred to as Operation Example 1), the operation in which the angle of combiner 3 is adjusted counter-clockwise (hereinafter referred to as Operation Example 2), the operation in which the angle of combiner 3 is adjusted clockwise (hereinafter referred to as Operation Example 3), and the operation in which combiner 3 transitions from the standing state to the storage state (hereinafter referred to as Operation Example 4).

Operation Example 1

Figure 3:
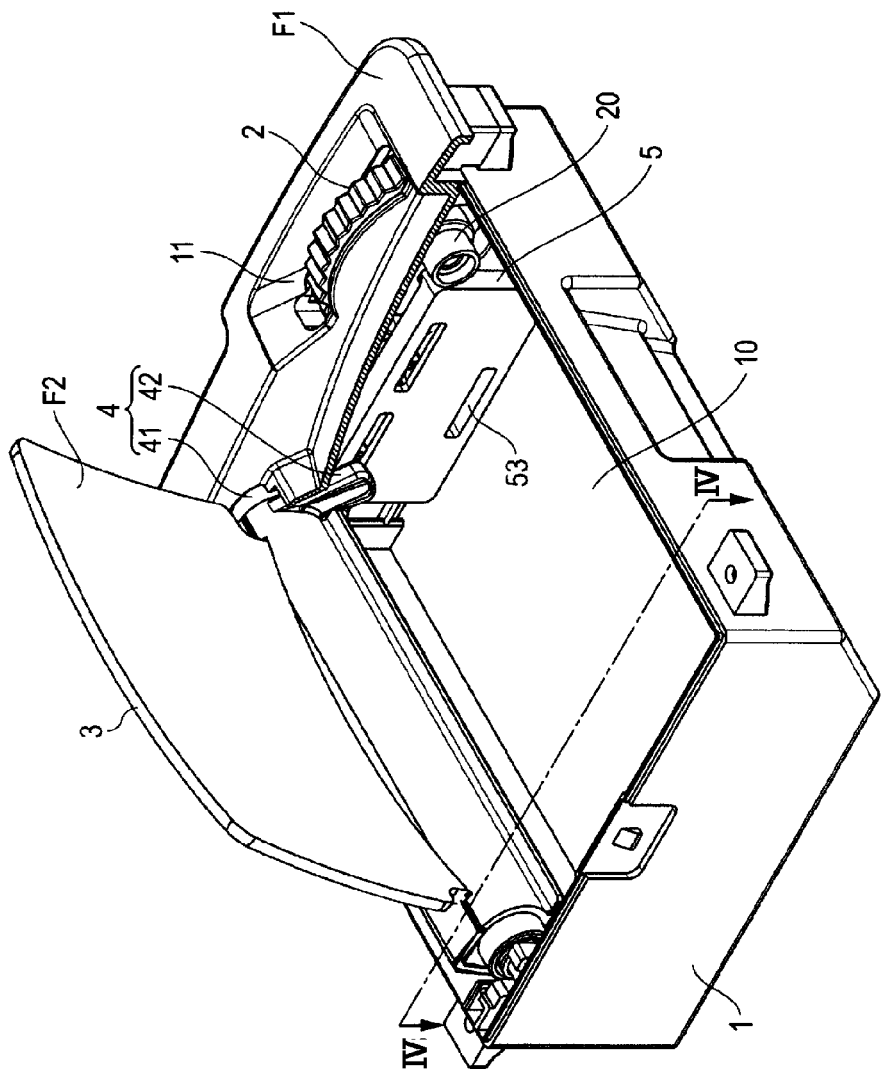
FIG. 3 is a perspective view illustrating the external appearance of the panel opening/closing device (in a standing state) according to the exemplary embodiment of the present disclosure.
Figure 4:
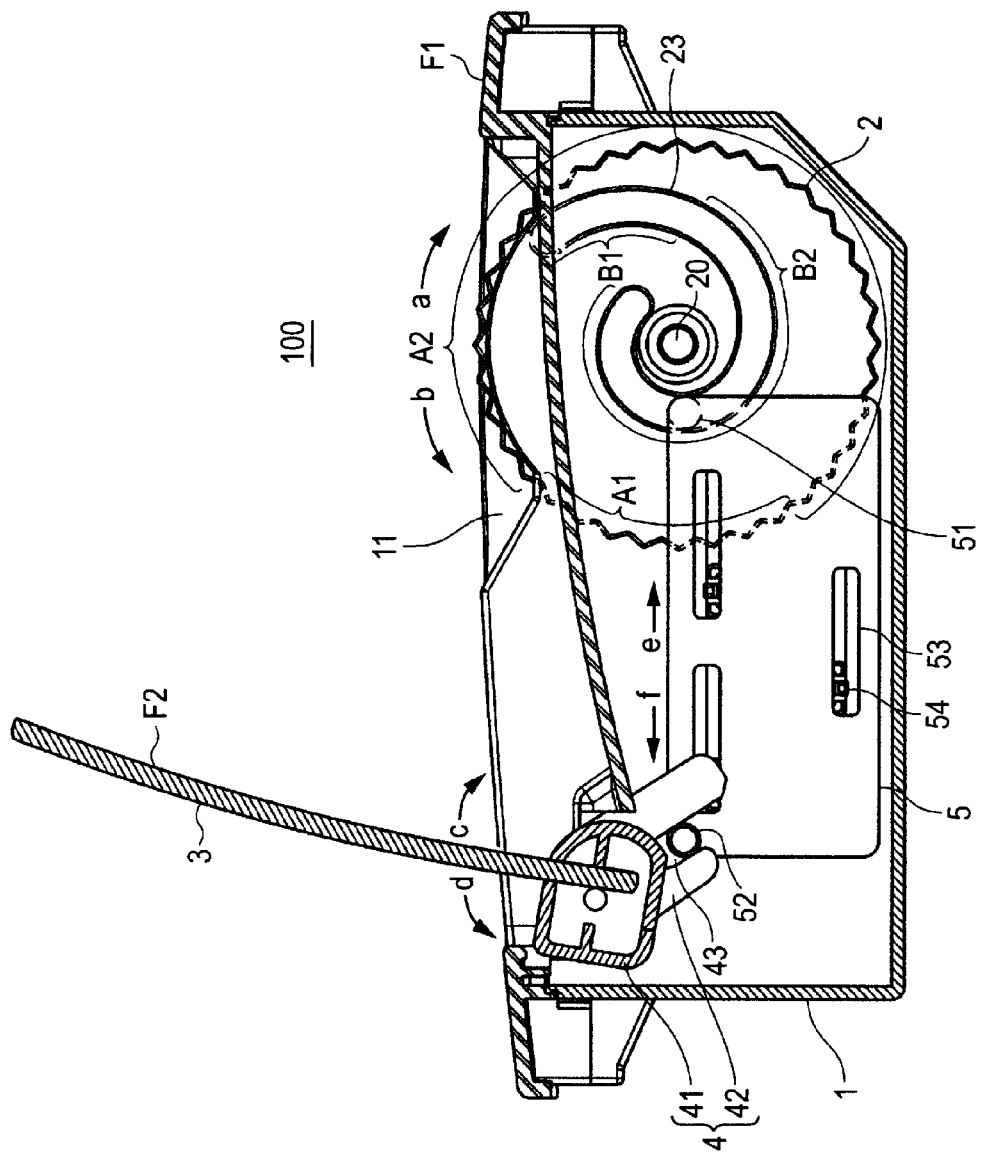
FIG. 4 is a lateral cross-sectional view illustrating the inside of the panel opening/closing device (in the standing state) according to the exemplary embodiment of the present disclosure.

With reference to FIGS. 1 to 4, Operation Example 1 is described. As described above, FIG. 1 illustrates the external appearance of panel opening/closing device 100 in which combiner 3 is in the storage state, and FIG. 2 is a cross-sectional view taken along II-II of FIG. 1. FIG. 3 is a perspective view illustrating the external appearance of panel opening/closing device 100 in which combiner 3 is in the standing state. FIG. 4 is a cross-sectional view taken along IV-IV of FIG. 3.

In the storage state of combiner 3 illustrated in FIGS. 1 and 2, a user performs the first operation on dial 2 exposed in recess 11. Specifically, the user operates operating region A1 of dial 2 to turn dial 2 counter-clockwise (in the direction of arrow "b").

When dial 2 turns counter-clockwise, pin 51 located at an end part of groove region B1 of groove 23 undergoes horizontal movement in the direction of arrow "e". At the same time, movable unit 5 and pin 52 also undergo horizontal movement in the direction of arrow "e". At this time, pins 54 slide in grooves 53 formed along the direction of the horizontal movement (the direction of arrow "e"), respectively, and thus pin 51 and pin 52 do not run off a line in the direction of arrow "e" during the movement.

When pin 52 undergoes the horizontal movement in the direction of arrow "e", pin holder 42 and main unit 41 turn counter-clockwise (in the direction of arrow "d"). Accordingly, combiner 3 fixed to main unit 41 turns counter-clockwise (in the direction of arrow "d") and is placed in the standing state illustrated in FIGS. 3 and 4. In this standing state, a user can visually check an image projected onto projection screen F2. The angle through which combiner 3 turns from the storage state to the standing state is, for example, 70 degrees. This angle of turn of combiner 3 is preferably greater than the angle through which a user turns dial 2. This makes it possible to quickly place combiner 3 into the standing state in a reduced number of operations, allowing the convenience of users to improve.

Operation Example 2

Figure 5:
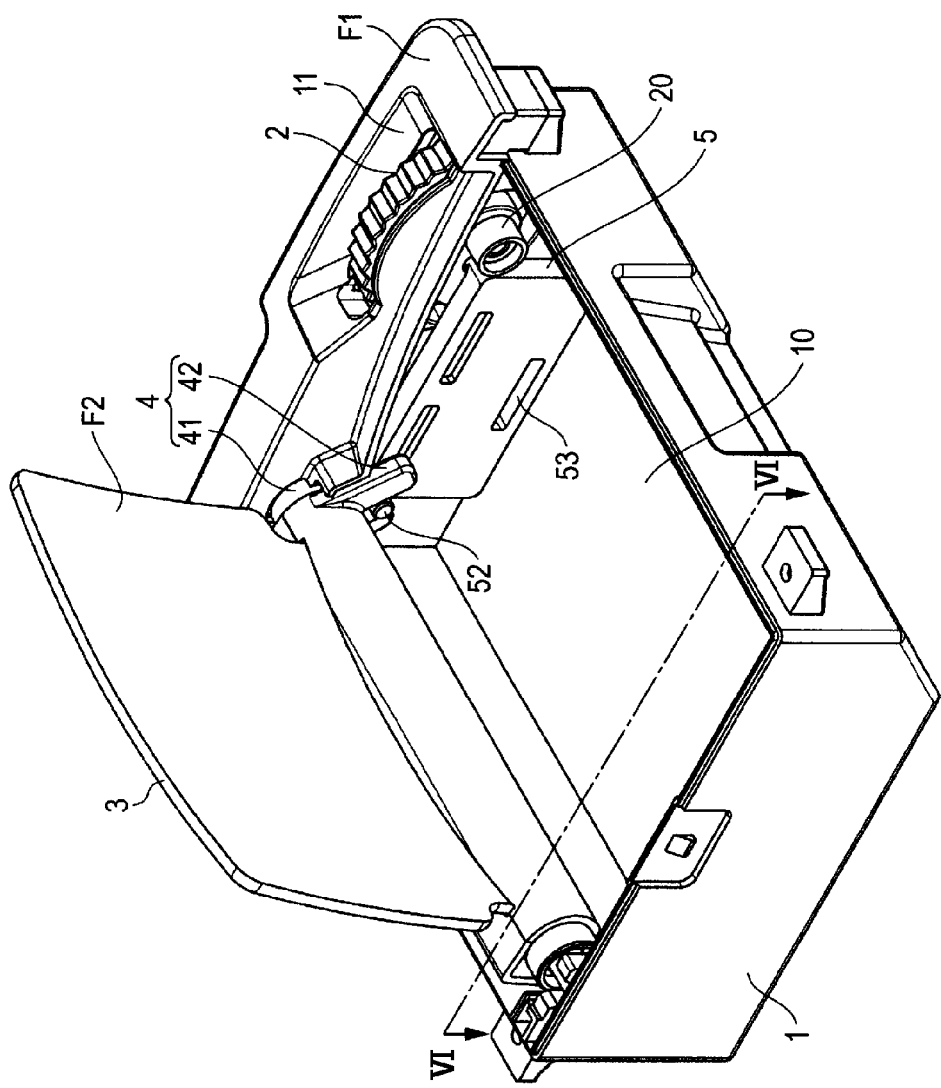
FIG. 5 is a perspective view illustrating the external appearance of the panel opening/closing device (in an angle adjustment state) according to the exemplary embodiment of the present disclosure.
Figure 6:
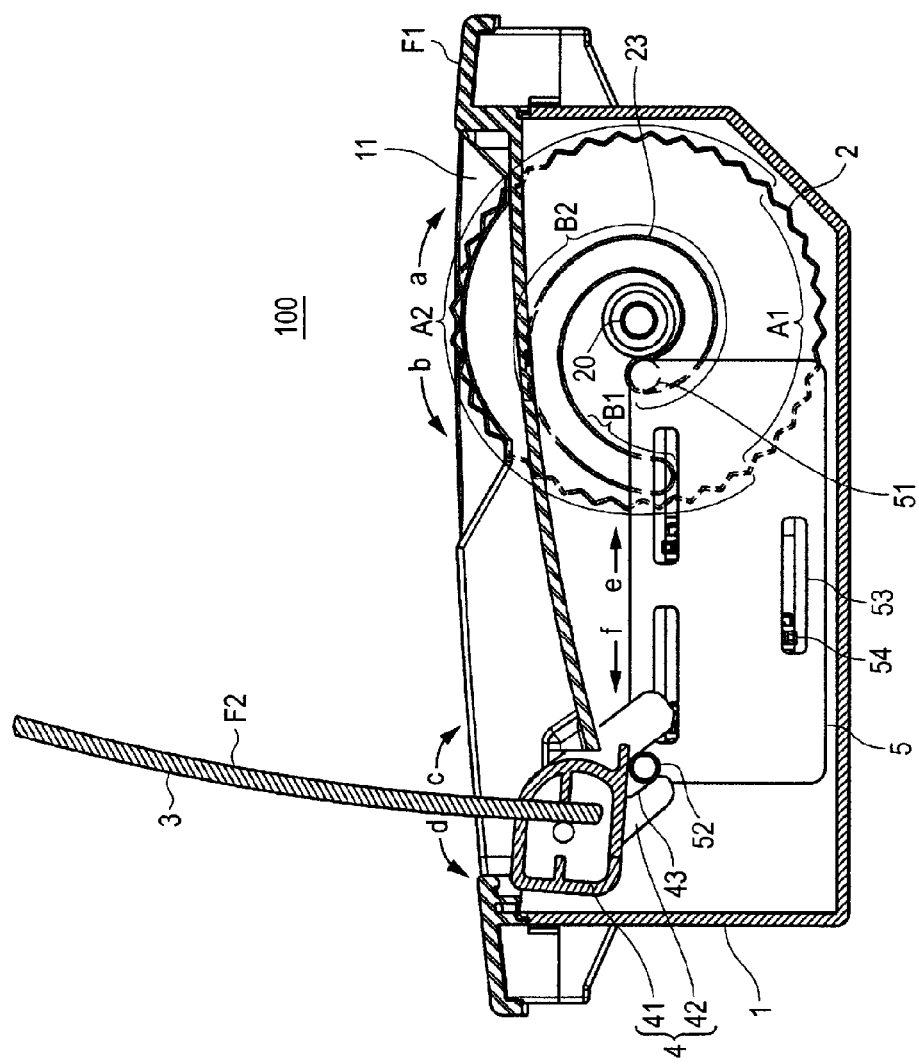
FIG. 6 is a lateral cross-sectional view illustrating the inside of the panel opening/closing device (in the angle adjustment state) according to the exemplary embodiment of the present disclosure.

With reference to FIGS. 3 to 6, Operation Example 2 is described. FIG. 5 is a perspective view illustrating the external appearance of panel opening/closing device 100 in which combiner 3 is in the angle adjustment state. FIG. 6 is a cross-sectional view taken along VI-VI of FIG. 5.

In the standing state of combiner 3 illustrated in FIGS. 3 and 4, when a user wishes to adjust combiner 3 to a desired angle by turning combiner 3 counter-clockwise, the user performs the third operation on dial 2 exposed in recess 11. Specifically, the user operates operating region A2 of dial 2 to turn dial 2 counter-clockwise (in the direction of arrow "b"). This places combiner 3 into the angle adjustment state illustrated in FIGS. 5 and 6.

When dial 2 turns counter-clockwise, pin 51 located at the end part of groove region B1 of groove 23 undergoes horizontal movement in the direction of arrow "e". At the same time, movable unit 5 and pin 52 also undergo horizontal movement in the direction of arrow "e".

When pin 52 undergoes the horizontal movement in the direction of arrow "e", pin holder 42 and main unit 41 turn counter-clockwise (in the direction of arrow "d"). Accordingly, combiner 3 fixed to main unit 41 turns counter-clockwise (in the direction of arrow "d"). At the point in time when the angle of combiner 3 reaches the desired angle, the user finishes the third operation, and combiner 3 is maintained at the angle designated by the user. The angle through which combiner 3 can turn in the direction of arrow "d" from the standing state is, for example, 12 degrees. Thus, the user can adjust combiner 3 to a desired angle in the range of 70 degrees to 82 degrees.

Operation Example 3

With reference to FIGS. 3 to 6, Operation Example 3 is described.

In the angle adjustment state of combiner 3 illustrated in FIGS. 5 and 6, when a user wishes to adjust combiner 3 to a desired angle by turning combiner 3 clockwise, the user performs the fourth operation on dial 2 exposed in recess 11. Specifically, the user operates operating region A2 of dial 2 to turn dial 2 clockwise (in the direction of arrow "a").

When dial 2 turns clockwise, pin 51 located at the end part of groove region B1 of groove 23 undergoes horizontal movement in the direction of arrow "f". At the same time, movable unit 5 and pin 52 also undergo horizontal movement in the direction of arrow "f". At this time, pins 54 slide in grooves 53 formed along the direction of the horizontal movement (the direction of arrow "f"), respectively, and thus pin 51 and pin 52 do not run off a line in the direction of arrow "f" during the movement.

When pin 52 undergoes the horizontal movement in the direction of arrow "f", pin holder 42 and main unit 41 turn clockwise (in the direction of arrow "c"). Accordingly, combiner 3 fixed to main unit 41 turns clockwise (in the direction of arrow "c"). At the point in time when the angle of combiner 3 reaches the desired angle, the user finishes the fourth operation, and combiner 3 is maintained at the angle designated by the user. The angle through which combiner 3 can turn in the direction of arrow "c" from the state in which combiner 3 has turned counter-clockwise up to maximum is, for example, 12 degrees. Thus, a user can adjust combiner 3 to a desired angle in the range of 82 degrees to 70 degrees.

Furthermore, in the angle adjustment state of combiner 3 illustrated in FIGS. 5 and 6, when a user wishes to return combiner 3 to the standing state by tilting combiner 3 clockwise, the user performs the fourth operation on dial 2 exposed in recess 11. Also in this case, Operation Example 3 described above is applied in panel opening/closing device 100. As a result, combiner 3 transitions from the angle adjustment state to the standing state.

Operation Example 4

With reference to FIGS. 1 to 4, Operation Example 4 is described.

In the standing state of combiner 3 illustrated in FIGS. 3 and 4, a user performs the second operation on dial 2 exposed in recess 11. Specifically, the user operates operating region A1 of dial 2 to turn dial 2 clockwise (in the direction of arrow "a").

When dial 2 turns clockwise, pin 51 located at the end part of groove region B1 of groove 23 undergoes horizontal movement in the direction of arrow "f". At the same time, movable unit 5 and pin 52 also undergo horizontal movement in the direction of arrow "f".

When pin 52 undergoes the horizontal movement in the direction of arrow "f", pin holder 42 and main unit 41 turn clockwise (in the direction of arrow "c"). Accordingly, combiner 3 fixed to main unit 41 turns clockwise and is placed in the storage state illustrated in FIGS. 1 and 2.

The foregoing describes the operation examples of panel opening/closing device 100.

Thus, in the panel opening/closing device 100, the state of combiner 3 can be switched among the storage state, the standing state, and the angle adjustment state with a simple structure with a small number of components. Thus, the production cost of panel opening/closing device 100 can be reduced.

Furthermore, in panel opening/closing device 100, movable unit 5 undergoes horizontal movement and support 4 supporting combiner 3 turns during turn of dial 2 which turns in accordance with an operation by a user. This makes it possible to switch the state of combiner 3 among the storage state, the standing state, and the angle adjustment state while reducing the amount of movement of movable unit 5 in the direction of horizontal movement (in other words, in the longitudinal direction of a vehicle). Thus, in the present exemplary embodiment, panel opening/closing device 100 can be installed with a compact size in the longitudinal direction of a vehicle.

Furthermore, in panel opening/closing device 100, combiner 3 can be placed in the standing state with a reduced amount of turn of dial 2, or the angle of combiner 3 can be adjusted with an increased amount of turn of dial 2.

Modifications of Exemplary Embodiment

Note that the panel opening/closing device in the present disclosure is not limited to the exemplary embodiment described above. Modifications of the exemplary embodiment described above are described below.

Modification 1

Figure 7:
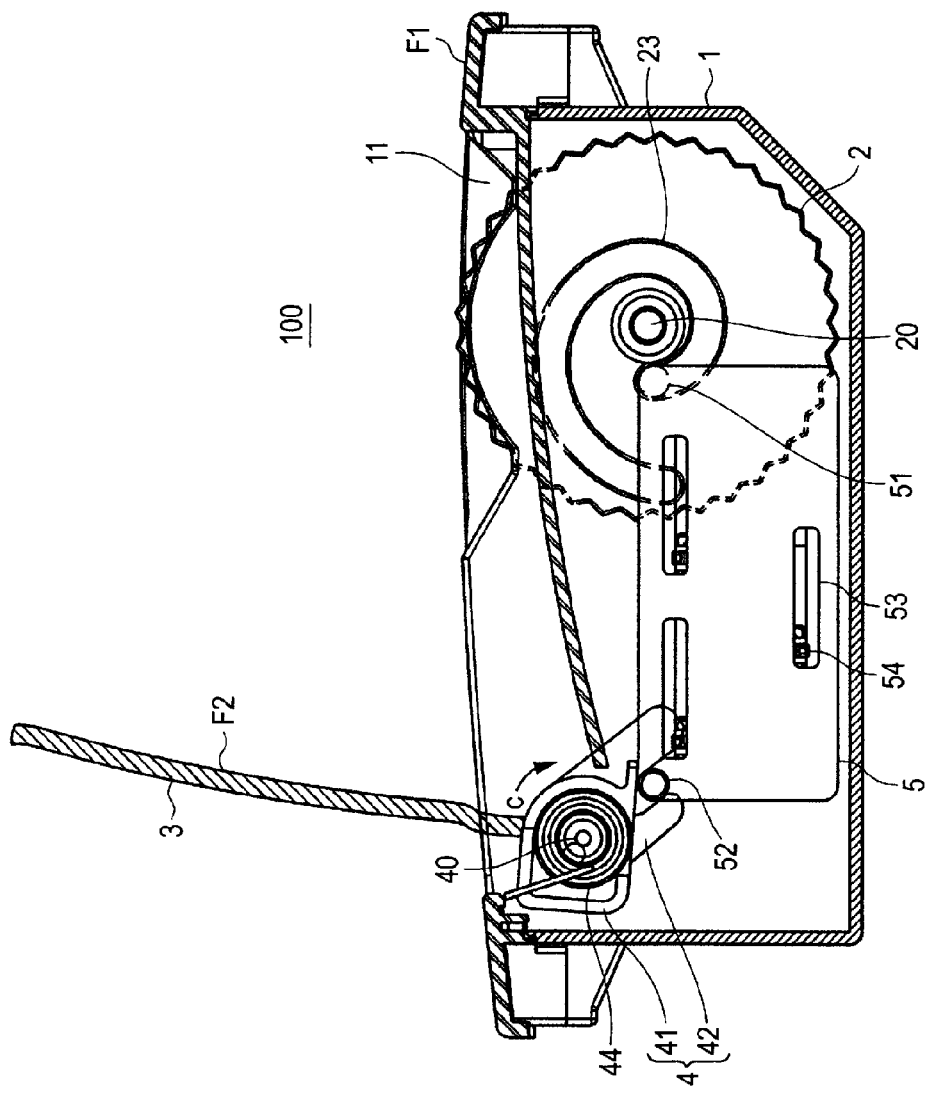
FIG. 7 is a lateral cross-sectional view illustrating the inside of a panel opening/closing device according to Modification 1 of the exemplary embodiment of the present disclosure.

As illustrated in FIG. 7, support 4 may include spring 44 in main unit 41. Spring 44 acts clockwise (in the direction of arrow "c") of support 4. This causes combiner 3 in the storage state to be pressed clockwise under the action of spring 44 in addition to the weight of combiner 3 itself. Thus, wobble due to vibration or the like can be reduced. The force of spring 44 is preferably maximized between when combiner 3 is in the standing state and when combiner 3 is in the angle adjustment state. This makes it possible to reduce blurring of an image displayed on combiner 3, facilitating visual checking of the image by a user.

Modification 2

Figure 8A:
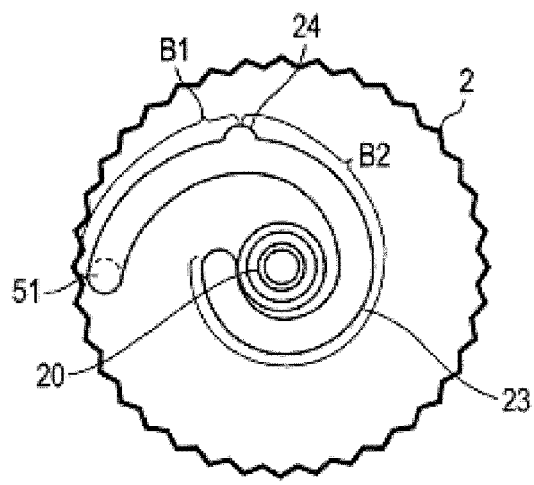
FIG. 8A is a lateral view illustrating a dial according to a first example in Modification 2 of the exemplary embodiment of the present disclosure.

As illustrated in FIG. 8A, recess 24 may be formed in groove 23 of dial 2 at the boundary between groove region B1 and groove region B2. When dial 2 turns counter-clockwise or clockwise, a part of pin 51 fits into recess 24. Accordingly, a user can feel a clicking feeling and easily recognize that combiner 3 has been placed in the standing state.

Figure 8B:
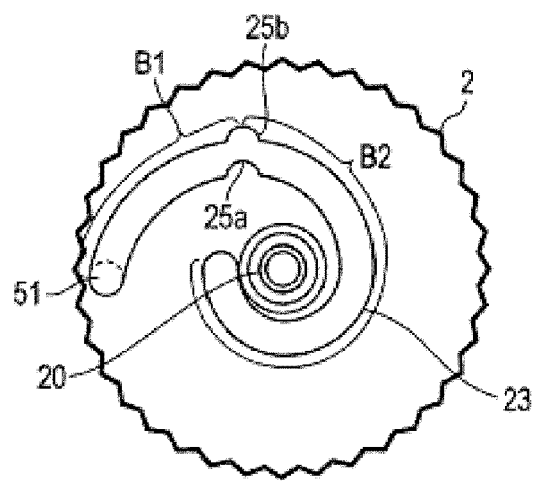
FIG. 8B is a lateral view illustrating a dial according to a second example in Modification 2 of the exemplary embodiment of the present disclosure.

Alternatively, as illustrated in FIG. 8B, protrusion 25a and recess 25b may be formed in groove 23 of dial 2 at the boundary between groove region B1 and groove region B2. When dial 2 turns counter-clockwise or clockwise, a part of pin 51 fits between protrusion 25a and recess 25b. Accordingly, a user can feel a clicking feeling and easily recognize that combiner 3 has been placed in the standing state.

Figure 8C:
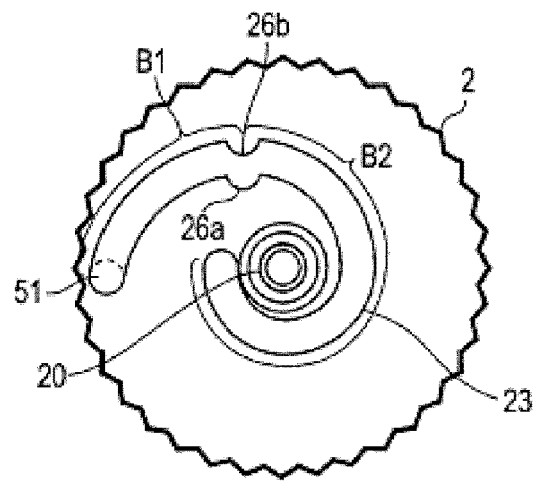
FIG. 8C is a lateral view illustrating a dial according to a third example in Modification 2 of the exemplary embodiment of the present disclosure.

Alternatively, as illustrated in FIG. 8C, recess 26a and protrusion 26b may be formed in groove 23 of dial 2 at the boundary between groove region B1 and groove region B2. When dial 2 turns counter-clockwise or clockwise, a part of pin 51 fits between recess 26a and protrusion 26b. Accordingly, a user can feel a clicking feeling and easily recognize that combiner 3 has been placed in the standing state.

Modification 3

Figure 9:
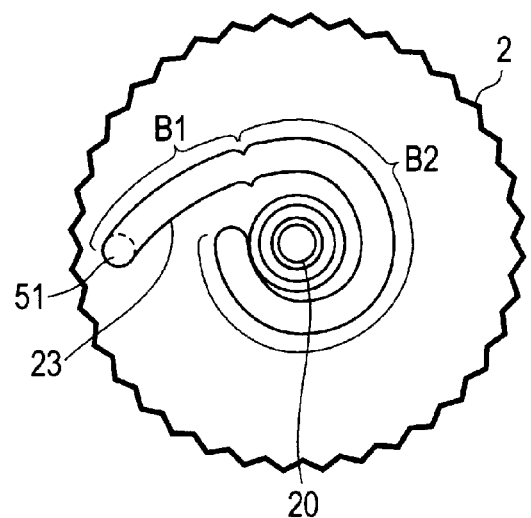
FIG. 9 is a lateral view illustrating a dial according to Modification 3 of the exemplary embodiment of the present disclosure.

While groove region B1 and groove region B2 are connected with a smooth curve in groove 23 of dial 2, as illustrated in FIG. 2, for example, in the exemplary embodiment, this is not limiting. For example, as illustrated in FIG. 9, the boundary between groove region B1 and groove region B2 does not need to be a smooth curve in groove 23 of dial 2. Accordingly, when pin 51 is positioned at the boundary between groove region B1 and groove region B2 during turn of dial 2, a user can feel a clicking feeling and easily recognize that combiner 3 has been placed in the standing state.

Modification 4

Figure 10:
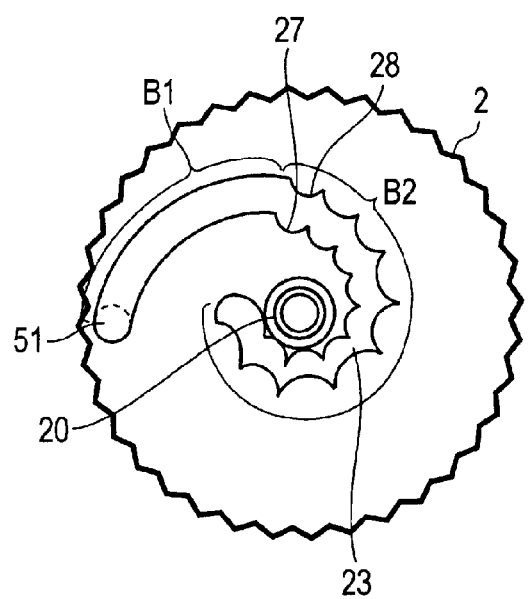
FIG. 10 is a lateral view illustrating a dial according to Modification 4 of the exemplary embodiment of the present disclosure.

As illustrated in FIG. 10, groove 23 of dial 2 may include a plurality of recesses 27 and a plurality of protrusions 28 in groove region B2. Single recess 27 and single protrusion 28 form a pair. Recess 27 and protrusion 28 in a pair are provided for each angle of adjustable combiner 3. Every time dial 2 turns in a small angle, a part of pin 51 fits between a pair of recess 27 and protrusion 28. Accordingly, a user can feel a clicking feeling and easily recognize that combiner 3 is in the angle adjustment state. Furthermore, a user can easily adjust the angle of combiner 3. Note that the pairs each including recess 27 and protrusion 28 are formed adjacent to each other in FIG. 10, but may be formed at a predetermined distance therebetween.

Modification 5

Dial 2 is preferably provided at a location closer to a user than combiner 3 is so that the user can easily operate dial 2. For example, dial 2 alone may be separated from casing 1 and positioned close to the user's hands. This allows the user to easily operate dial 2.

Modification 6

When there is a difference in elevation in the instrumental panel along the traverse direction of the vehicle, panel opening/closing device 100 may be provided in such a way that dial 2 is located on the lower elevation portion of the instrumental panel. Dial 2 needs to be exposed so that a user can operate dial 2. Therefore, providing dial 2 on the lower elevation portion of the instrumental panel allows downsizing of dial 2, thereby making it possible to reduce the size of panel opening/closing device 100.

Modification 7

While dial 2, support 4, and movable unit 5 are provided on the right-end part of casing 1, as illustrated in FIG. 1, in the exemplary embodiment, this is not limiting. For example, dial 2, support 4, and movable unit 5 may be on a left-end part of casing 1.

Modification 8

The panel is not limited to combiner 3, and may be, for example, a liquid-crystal panel, a mirror, a lid, or other members.

Modification 9

The operation of opening and closing combiner 3 may be performed by the power of an electric motor instead of the operation of manually turning dial 2. For example, a rotary shaft of an electric motor may be connected to rotary shaft 20 of dial 2 so that dial 2 is turned by driving of the electric motor. This allows a user to switch the state of combiner 3 among the storage state, the standing state, and the angle adjustment state through an operation of providing an instruction to drive the electric motor.

The present disclosure is applicable to a panel opening/closing device for opening/closing a panel.

What is claimed is:

1. A panel opening/closing device comprising:
   a support which fixedly supports a panel and is turnable about a first rotary shaft;
   a dial which is gear-shaped and is turnable about a second rotary shaft and is provided with a scroll-shaped groove varying in distance from the second rotary shaft;
   a movable unit which undergoes linear movement along with a turning of the dial and includes a first protruding portion that is inserted in the scroll-shaped groove of the dial and a turn driving portion that turns the support along with the linear movement; and
   a casing which houses the support, the dial, and the movable unit therein,
   wherein the movable unit is provided with a groove along a direction of the linear movement and
   the casing has a second protruding portion inserted in the groove of the movable unit.

2. The panel opening/closing device according to claim 1,
   wherein the panel is configured to stay in either a storage state in which the panel is stored in the casing, a standing state in which the panel is standing, or an angle adjustment state in which a slope of the panel is adjustable,
   the dial includes:
   a first operating region where an operation of changing the storage state to the standing state is performed, and
   a second operating region where an operation of changing the standing state to the angle adjustment state is performed;
   the scroll-shaped groove of the dial is provided with:
   a first groove region where the first protruding portion slides when the first operating region is operated, and
   a second groove region where the first protruding portion slides when the second operating region is operated, the second groove region being in communication with the first groove region; and
   a distance between the second rotary shaft and the first groove region is greater than a distance between the second rotary shaft and the second groove region.

3. The panel opening/closing device according to claim 2,
   wherein the scroll-shaped groove of the dial includes a recess or a protrusion at a boundary between the first groove region and the second groove region.

4. The panel opening/closing device according to claim 2,
   wherein the second groove region is provided with a plurality of recesses.

5. The panel opening/closing device according to claim 2,
   wherein a shape of a surface of the first operating region is different from a shape of a surface of the second operating region.

6. The panel opening/closing device according to claim 1,
   wherein the panel is configured to stay in either a storage state in which the panel is stored in the casing, a standing state in which the panel is standing, or an angle adjustment state in which a slope of the panel is adjustable,
   the support includes a spring which acts in a direction in which the support turns when the panel changes from the standing state into the storage state; and
   a force of the spring is maximized between when the panel is in the standing state and when the panel is in the angle adjustment state.

7. A panel opening/closing device comprising:
   a support which fixedly supports a panel and is turnable about a first rotary shaft;
   a dial which is gear-shaped and is turnable about a second rotary shaft and is provided with a scroll-shaped groove varying in distance from the second rotary shaft;
   a movable unit which undergoes linear movement along with a turning of the dial and includes a first protruding portion that is inserted in the scroll-shaped groove of the dial and a turn driving portion that turns the support along with the linear movement; and
   a casing which houses the support, the dial, and the movable unit therein,
   wherein the panel is configured to stay in either a storage state in which the panel is stored in the casing, a standing state in which the panel is standing, or an angle adjustment state in which a slope of the panel is adjustable,
   the support includes a spring which acts in a direction in which the support turns when the panel changes from the standing state into the storage state; and
   a force of the spring is maximized between when the panel is in the standing state and when the panel is in the angle adjustment state.

* * * * *